United States Patent
Scheffel et al.

[11] Patent Number: 5,865,213
[45] Date of Patent: Feb. 2, 1999

[54] CONTROLLABLE VALVE

[75] Inventors: Martin Scheffel, Vaihingen; Gerhard Stokmaier, Markgroningen; Hans-Friedrich Schwarz, Muhlacker, all of Germany

[73] Assignee: Robert Bosch GmbH, Stuttgart, Germany

[21] Appl. No.: 817,488

[22] PCT Filed: May 14, 1996

[86] PCT No.: PCT/DE96/00848

§ 371 Date: Apr. 10, 1997

§ 102(e) Date: Apr. 10, 1997

[87] PCT Pub. No.: WO97/06040

PCT Pub. Date: Feb. 20, 1997

[30] Foreign Application Priority Data

Aug. 10, 1995 [DE] Germany ............... 195 29 363.0

[51] Int. Cl.$^6$ .............. F16K 31/06; B60T 8/36
[52] U.S. Cl. .............. 137/614.16; 251/129.15; 303/119.2; 137/596.17
[58] Field of Search .......... 251/129.02, 129.15, 251/129.21; 137/614.16, 614.17, 614.18; 303/119.2, 117.1, 596.17

[56] References Cited

U.S. PATENT DOCUMENTS

| 4,830,332 | 5/1989 | Miura et al. | 251/129.15 X |
| 5,203,617 | 4/1993 | Wilde | 303/119.2 X |
| 5,542,755 | 8/1996 | Staib et al. | 303/119.2 |
| 5,649,748 | 7/1997 | Oehler et al. | 303/119.2 |
| 5,735,582 | 4/1998 | Eith et al. | 137/596.17 X |

FOREIGN PATENT DOCUMENTS

| 2275715 | 1/1976 | France . | |
| 4312414 | 10/1994 | Germany | 303/119.2 |

*Primary Examiner*—Kevin Lee
*Attorney, Agent, or Firm*—Edwin E. Greigg; Ronald E. Greigg

[57] ABSTRACT

The invention relates to an electromagnetically actuated, controllable valve with first and second valve stages, of which the first stage is actuated by an armature and the second stage functions automatically. An opening cross-section of the first valve stage is small and an opening cross-section of the second valve stage is larger than said opening cross section of said first stage. The first valve stage when in a closed position keeps the second valve stage closed. When the first valve stage opens a spring element opens the second valve stage. The valve according to the invention has an advantage of an only slight actuating force, and the total actuating force is actuatable exclusively to the first valve stage, and the further advantage of a large opening cross-section and hence a low flow resistance.

17 Claims, 3 Drawing Sheets

CONTROLLABLE VALVE

PRIOR ART

The invention is based on a controllable valve. Such used as an intake valve in hydraulic brake system for motor vehicles with ABS, ASR traction control or dynamic vehicle movement control. They are disposed upstream of a return pump in an intake line coming from a master cylinder. In their basic position, these valves are closed, and they can be opened in operation of the return pump, so that this pump can aspirate brake fluid from the master cylinder.

Difficulties can arise if the return pump has to aspirate brake fluid from the master cylinder itself when the brake pedal is not being depressed. This delays the pressure buildup and hence the actuation of the vehicle brakes. To keep the intake resistance low, an opening cross-sectional area of the valve, which is normally the bore diameter of a valve seat, is selected to be large.

However, this has the disadvantage that the requisite forces for opening the valve are high. The actuating forces for opening the valve gain significance especially if the intake valve is to be opened while the master cylinder is actuated. In that case, the brake fluid at an inlet to the valve is under pressure, and the valve must be opened against a high pressure difference. This requires a strong and hence large electromagnet.

ADVANTAGES OF THE INVENTION

The valve according to the invention has the advantage that initially a first valve stage with a small opening cross-sectional area is opened, for which purpose a small actuating force suffices. The opening of the first valve stage causes a pressure drop, or more precisely a reduction in the pressure gradient at the valve according to the invention, as a consequence of which a second valve stage is opened by a spring element and uncovers a large opening cross-sectional area. As long as the pressure difference after opening of the first valve stage is great enough that the second valve stage does not open against this pressure difference, the brake fluid throughput through the first valve stage of the valve of the invention suffices to supply adequate brake fluid to the return pump for a rapid pressure buildup.

The valve of the invention has the further advantage that only the first valve stage has to be actuated, and all the actuating force is available to it. The second valve stage functions automatically. The valve of the invention has a simple design and a compact structure. Because of the low actuating forces, a magnet that is usual for the magnet valves of hydraulic vehicle brake systems can be used; the outer dimensions of the valve of the invention may agree with those of valves used in hydraulic vehicle brake systems, so that installing the valve of the invention in a hydraulic vehicle brake system presents no problems.

A advantageous further features of and improvements to the invention are defined hereinafter.

The valve of the invention may be actuated mechanically, pneumatically, or hydraulically, for example. Preferably, the actuation is effected electromagnetically.

BRIEF DESCRIPTION OF THE DRAWINGS

The invention will be described in further detail below in terms of exemplary embodiments shown in the drawing. Shown are.

DESCRIPTION OF THE EXEMPLARY EMBODIMENTS

Figure 1:
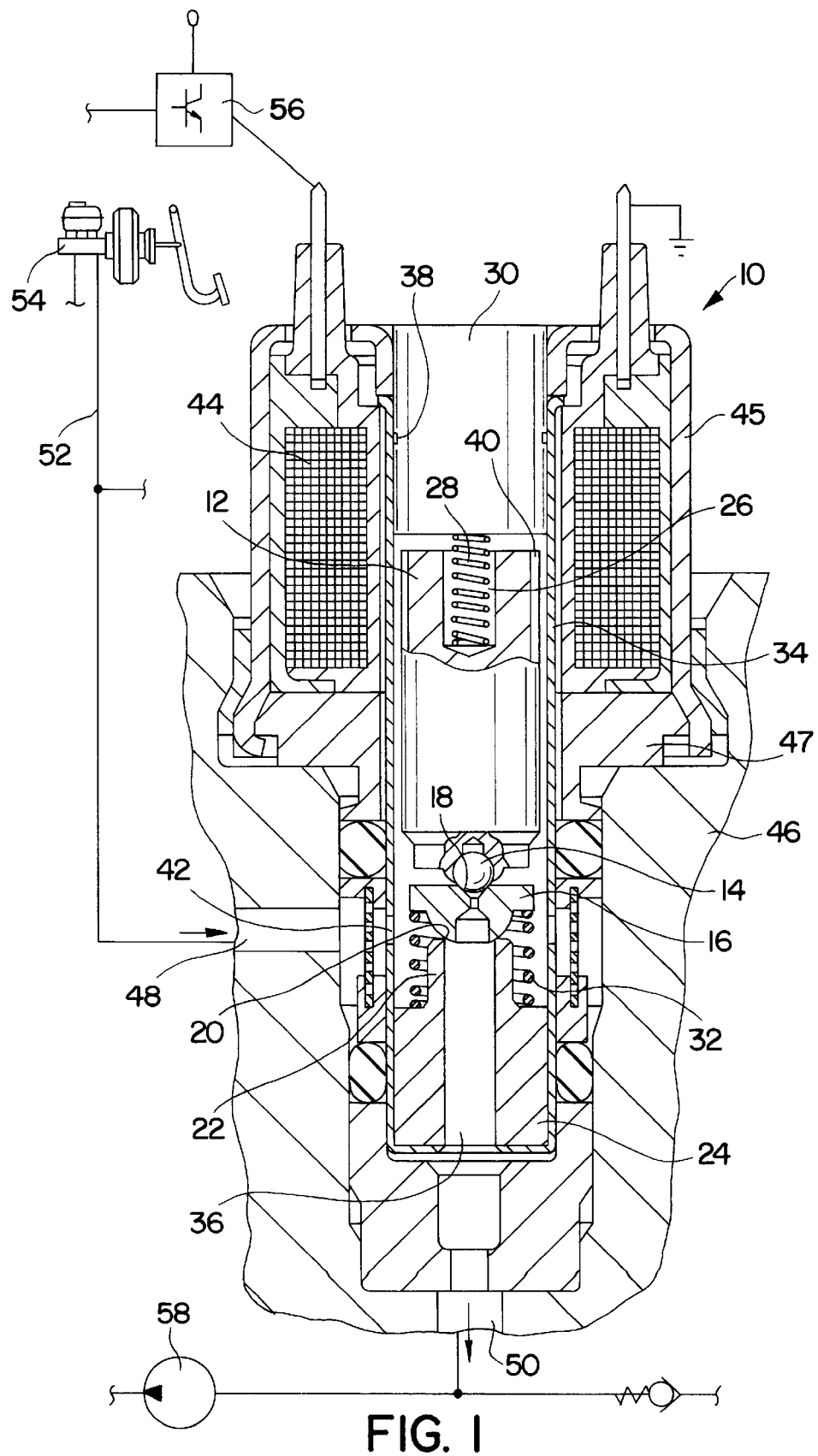
FIG. 1, a valve of the invention in axial section.

The valve 10 according to the invention, shown in FIG. 1, has a cylindrical armature 12, in one face end of which a ball, as a first valve closing body 14, is mounted by caulking. A second valve closing body 16 is disposed coaxially to the armature 12 and has a conical first valve seat 18 for the first valve closing body 14. This second valve closing body 16 takes the form of a ball cap, remote from the armature 12, with a radial flange on a bottom side of the ball cap toward the armature 12. The radial flange is drilled axially through to form a mouth which is embodied conically as a first valve seat 18.

A second, conical valve seat 20 is embodied on a tubular portion 22 of a cylindrical, axially drilled-through valve seat part 24 of the second valve closing part 16. The second valve seat 20 cooperates with the ball caplike portion of the second valve closing body 16. The valve seat part 24 is disposed coaxially to the armature 12 and the second valve closing body 16.

On its face end remote from the first valve closing body 14, the armature 12 has a blind bore 26, into which a helical compression spring 28 is inserted. The helical compression spring 28 is braced against a cylindrical magnet core 30 that is coaxial with the armature 12. The helical compression spring presses the first valve closing body 14, mounted on the armature 12, against the first valve seat face 18. The first valve closing body 14 in turn presses against the second valve closing body 16, having the first valve seat face 18, against the second valve seat 20. The valve 10 according to the invention, when in its basic position, is closed.

The first valve closing body 14 with the first valve seat face 18 forms a first valve stage of the valve 10 of the invention. The second valve closing body 16, together with the second valve closing face 20, forms a second valve stage of the valve 10 of the invention. A sealing seat diameter of the first valve seat 18 and hence an opening cross-sectional area of the first valve stage is smaller than a sealing seat diameter of the second valve seat 20, or than an opening cross-sectional area of the second valve stage.

The tubular portion 22 of the valve seat part 24 receives a second helical compression spring 32, which is braced against the valve seat part 24 and engages the radial flange of the second valve closing body 16. The second helical compression spring 32 acts counter to the first helical compression spring 28. However, the second helical compression spring 32 is embodied less strongly, so that the first helical compression spring 28, in the illustrated basic position of the valve 10 of the invention, keeps both valve stages 14, 18, 16, 20 closed.

The armature 12, the first valve closing body 14, and the second valve closing body 16 are received, axially displaceably, in a pipe segment 34 one end of which is closed by the valve seat part 24 and the other end of which is closed by the magnet core 30. The valve seat part 24 is press-fitted hydraulically tightly into the pipe segment and is axially retained on the inside for instance by flanging over end of the pipe segment 34; the pipe segment 34 has a hole as a valve outlet 36. The magnet core 30 is hydraulically tightly joined to the pipe segment 34 by an encompassing weld 38.

The armature 12 has continuous longitudinal grooves 40 on its circumference to allow fluid to flow between the armature and the pipe segment 34.

As its inlet 42, the valve 10 of the invention has a plurality of transverse bores in the pipe segment 34, which are located in a radial plane approximately at the level of the second valve closing body 16. A pressure difference between the inlet 42 and the outlet 36 of the valve 10 of the invention acts in a closing manner on the two valve stages 14, 18, 16, 20.

The pipe segment 34, together with the two valve closing bodies 14, 16 and the valve seat part 24, forms a hydraulic part of the valve 10 of the invention.

For actuating a valve, a coil 44 is mounted on the end of the pipe segment 34 that contains the magnet core 30. Both the magnet core 30 and the armature 12 each extend approximately halfway into the coil 44. The coil 44 together with the magnet core 30, the coil housing 45 and the flange 47 forms an electromagnet.

The valve 10 is inserted into a hydraulic block 46 of a vehicle brake system not otherwise shown.

Of the hydraulic block 46, FIG. 1 shows a cutaway with an inlet conduit 48 leading radially to the inlet 42 of the valve and an outlet conduit 50 leading axially away from the valve outlet 36. FIG. 1 symbolically shows the hydraulic and electric circuitry of the valve 10 of the invention in its use as an intake valve.

The valve 10 of the invention functions as follows:

The inlet 42 of the valve 10 is connected to a master cylinder 54 via an intake line 52. Imposition of pressure by actuation of the master cylinder 54 acts in a closing manner on the two valve stages 14, 18, 16, 20 of the valve 10. For opening the valve 10, its coil 44 is supplied with current by a control unit 56 of the vehicle brake system; the magnet core 30 attracts the armature 12 and thereby lifts the first valve closing body 14 away from the first valve seat 18; the first valve is opened. A return pump 58 connected to the outlet 36 of the valve 10 receives brake fluid from the master cylinder 54.

A pressure gradient that may possibly exist between the inlet 42 and outlet 36 is reduced by the opening of the first valve stage 14, 18, so that the second valve closing body 16 is lifted away from the second valve seat 20 by the second helical compression spring 32. The second valve stage 16, 20, which has a larger opening cross-sectional area than the first valve stage 14, 18, is opened. By the opening of the second valve stage 16, 20, the valve 10 of the invention presents only slight flow resistance to the brake fluid, so that the return pump 58 can aspirate enough brake fluid for a rapid pressure buildup from the master cylinder 54. If the pressure gradient between the inlet 42 and outlet 36, even after the opening of the first valve stage 14, 18, is so great that the helical compression spring 32 does not lift the second valve closing body 16 away from the second valve seat 20, counter to the brake fluid pressure, then the throughput through the first valve stage 14, 18 is adequate for a rapid pressure buildup by means of the return pump 58.

Figure 2:
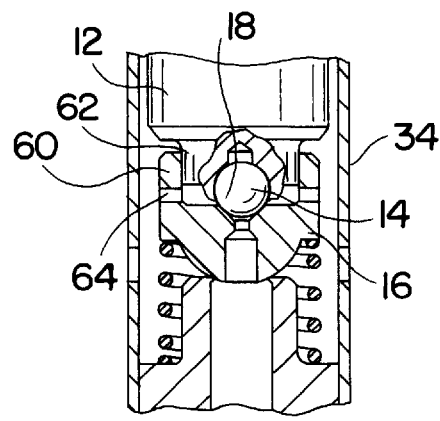
FIGS. 2, 3 and 4, illustrate details of modified embodiments of the valve according to the invention as shown in FIG. 1.
Figure 3:
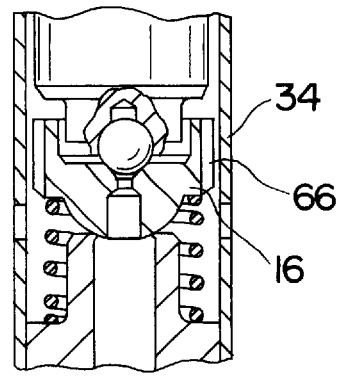
Figure 4:
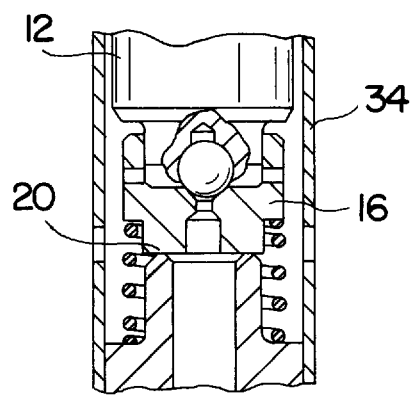

FIGS. 2–4 show modifications of the embodiment of a valve of the invention shown in FIG. 1. In each case a portion of the pipe segment 34 in the region of the two valve stages 14, 18, 16, 20 is shown. Below, only the changes will be described; the same reference numerals will be used for identical components. In FIG. 2, the first valve closing body 16 is guided on the armature 12: To that end, the first valve closing body 16 merges integrally in the direction of the armature 12 with a low hollow-cylindrical portion 60, which surrounds a short armature stub 62. Between the hollow-cylindrical portion 60 and the armature stub 62, there is a clearance fit; the second valve closing body can be displaced in the axial direction relative to the armature 12.

On the bottom of the hollow-cylindrical portion 60, radial bores 64 are made in the second valve closing body 16; they improve the fluid flow through the first valve stage 14, 18.

In the portion of an embodiment of the valve of the invention shown in FIG. 3, the second valve closing body 16 is guided axially displaceably in the pipe segment 34: On its circumference, it has a slight radial gap from the pipe segment 34. To improve the fluid flow between the second valve closing body 16 and the pipe segment 34, the circumference of the second valve closing body 16 is provided with continuous longitudinal grooves 66.

In the embodiment of the valve of the invention shown in FIG. 4, the second valve stage 16, 20 has a flat valve seat 20. The second valve closing body 16, as in the embodiment shown in FIG. 2, is guided on the armature 12.

Figure 5:
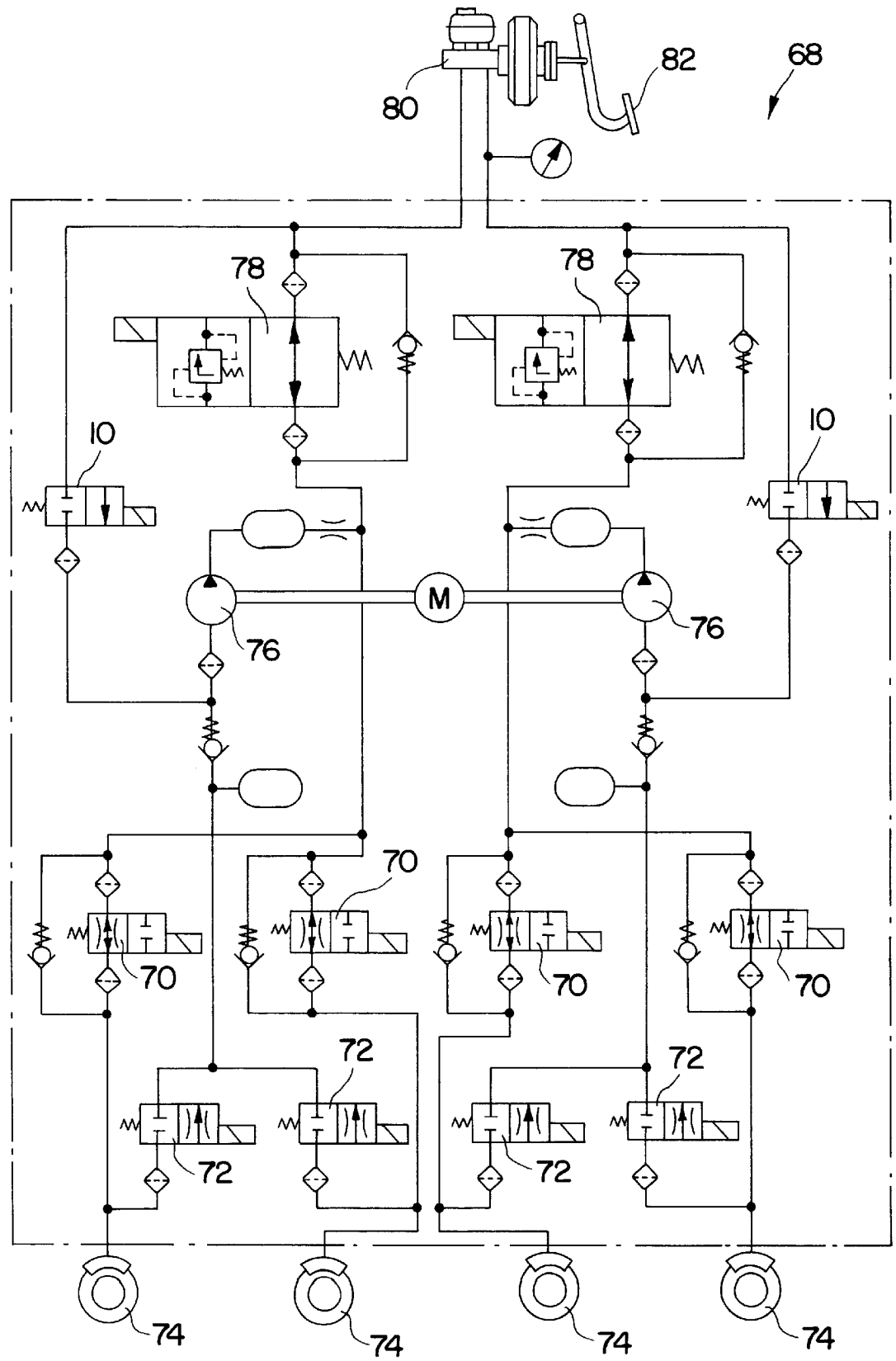
FIG. 5, illustrates a hydraulic circuit diagram of a vehicle brake system according to the invention.

The described valve 10 according to the invention can advantageously be used in a hydraulic vehicle brake system 68 that has ASR traction control and/or a dynamic vehicle movement control arrangement, as shown in FIG. 5. Such vehicle brake systems are known per se and are described for instance in German Patent DE 42 32 311 C1, which is hereby entirely incorporated by reference.

The vehicle brake system 68 has two brake circuits independent of one another. For ABS or anti-lock control, it has one inlet valve 70 and one outlet valve 72 for each wheel brake 74, as well as one return pump 76, in each brake circuit. If there is a threat of locking of a vehicle wheel, brake pressure modulation is performed in a manner known per se by means of the associated inlet and outlet valve 70, 72. For ASR traction control and dynamic vehicle movement control, a switchover valve 78 is also disposed in each brake circuit between a master cylinder 80 and the inlet valves 70 of this brake circuit.

The valve 10 according to the invention is built into each brake circuit as an intake valve between the master cylinder 80 and an intake side of the return pump 76. Its use is advantageous on account of the low actuating force required to open the first valve stage if the valve 10 is acted upon by pressure, or in other words when the brake pedal 82 of the master cylinder 80 is depressed. The small opening cross-section of the first valve stage suffices, if the brake fluid is under pressure, to supply the return pump 76 with enough brake fluid to assure a rapid buildup of brake fluid pressure by means of the return pump 76.

If the pressure at the inlet of the valve 10 of the invention is slight, for instance if the brake pedal 82 is not depressed, then upon the opening of the first valve stage the second valve stage opens as well; a large opening cross-section is available to the brake fluid, so as to keep the intake resistance of the return pump 76 low. This is important for ASR traction control and even more important for dynamic vehicle movement control, because these kinds of control must rely on a very fast response of the wheel brakes 74 and hence a very fast pressure buildup by means of the return pumps 76.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A controllable valve comprising a first valve stage, said first valve stage has a first, actuatable valve closing body that cooperates with a first valve seat (18), a second valve stage having a second valve closing body (16), which cooperates with a second valve seat (20), said second valve seat (20) has an opening cross-sectional area which is greater than an opening cross-sectional area of the first valve seat (18), and the first valve stage (14, 18), when closed by a first spring element (28) closes the second valve stage (16, 20), when the first valve stage (14, 18) is open the second valve closing body (16) is pressed away from the second valve seat (20) by a second spring element (32), the second valve closing body (16) incorporates the first valve seat (18), and that the first valve closing body (14) when pressed against the first valve seat (18) by said first spring element (28) presses the second valve closing body (16) against the second valve seat (20), the first valve closing body (14) and the second valve closing body (16) are accommodated coaxially and axially displaceably in a pipe segment (34) that incorporates the second valve seat (20).

2. A valve in accordance with claim 1, in which a cylindrical magnet core (30) is accommodated coaxially and hydraulically tightly in the pipe segment (34).

3. A valve in accordance with claim 1, in which the first valve closing body (14) has an armature (12), and that a longitudinal portion of the pipe segment (34) is surrounded by a coil (44) of an electromagnet, and a magnet core (30) and the armature (12) protrudes into the pipe segment (34).

4. A valve in accordance with claims 1–3, in which the first valve closing body (14) has an armature (12), and that a longitudinal portion of the pipe segment (34) is surrounded by a coil (44) of an electromagnet, and the cylindrical magnet core (30) and an armature (12) protrudes into the pipe segment (34).

5. A valve in accordance with claim 1, in which the valve (10) is an intake valve of a hydraulic vehicle brake system (68) with ABS and/or ASR traction control and/or dynamic vehicle movement control, the valve being disposed upstream of a return pump (76) in an intake line connected with a master cylinder (80).

6. A controllable valve comprising a first valve stage, said first valve stage has a first, actuatable valve closing body that cooperates with a first valve seat (18), a second valve stage having a second valve closing body (16), which cooperates with a second valve seat (20), said second valve seat (20) has an opening cross-sectional area which is greater than an opening cross-sectional area of the first valve seat (18), and the first valve stage (14, 18), when closed by a first spring element (28) closes the second valve stage (16, 20), when the first valve stage (14, 18) is open the second valve closing body (16) is pressed away from the second valve seat (20) by a second spring element (32), the first valve closing body (14) is pressed by said first spring element (28) against the first valve seat (18), and the force of the first spring element (28) is greater than the force of the second spring element (32) of the second valve closing body (16), the first valve closing body (14) and the second valve closing body (16) are accommodated coaxially and axially displaceably in a pipe segment (34) that incorporates the second valve seat (20).

7. A valve in accordance with claims 4–6, in which said pipe segment (34) includes at least one flow channel along an inside thereof between a lower side of said second valve closing body (16), facing said second valve seat (20), and upper side of said second valve closing body (16), facing said first actuatable valve closing body (10), said at least one flow channel having a cross-sectional area which is greater than a flow channel beginning at said first valve seat (18), and the valve (10) has an electromagnet (30, 44) for actuating the first valve closing body (14).

8. A controllable valve comprising a first valve stage, said first valve stage has a first, actuatable valve closing body that cooperates with a first valve seat (18), a second valve stage having a second valve closing body (16), which cooperates with a second valve seat (20), said second valve seat (20) has an opening cross-sectional area which is greater than an opening cross-sectional area of the first valve seat (18), and the first valve stage (14, 18), when closed by a first spring element (28) closes the second valve stage (16, 20), when the first valve stage (14, 18) is open the second valve closing body (16) is pressed away from the second valve seat (20) by a second spring element (32), the first valve closing body (14) and the second valve closing body (16) are accommodated coaxially and axially displaceably in a pipe segment (34) that incorporates the second valve seat (20), and the valve (10) has an electromagnet (30, 44) for actuating the first valve closing body (14).

9. A controllable valve comprising a first valve stage, said first valve stage has a first, actuatable valve closing body that cooperates with a first valve seat (18), a second valve stage having a second valve closing body (16), which cooperates with a second valve seat (20), said second valve seat (20) has an opening cross-sectional area which is greater than an opening cross-sectional area of the first valve seat (18), and the first valve stage (14, 18), when closed by a first spring element (28) closes the second valve stage (16, 20), when the first valve stage (14, 18) is open the second valve closing body (16) is pressed away from the second valve seat (20) by a second spring element (32), the first valve closing body (14) has an armature (12), and that a longitudinal portion of the pipe segment (34) is surrounded by a coil (44) of the electromagnet, and the magnet core (30) and the armature (12) protrudes into the pipe segment (34), and the valve (10) has an electromagnet (30, 44) for actuating the first valve closing body (14).

10. A controllable valve comprising a first valve stage, said first valve stage has a first, actuatable valve closing body that cooperates with a first valve seat (18), a second valve stage having a second valve closing body (16), which cooperates with a second valve seat (20), said second valve seat (20) has an opening cross-sectional area which is greater than an opening cross-sectional area of the first valve seat (18), and the first valve stage (14, 18), when closed by a first spring element (28) closes the second valve stage (16, 20), when the first valve stage (14, 18) is open the second valve closing body (16) is pressed away from the second valve seat (20) by a second spring element (32), the valve (10) is an intake valve of a hydraulic vehicle brake system (68) with ABS and/or ASR traction control and/or dynamic vehicle movement control, the valve being disposed upstream of a return pump (76) in an intake line connected with a master cylinder (80).

11. A valve in accordance with claim 10, in which the second valve closing body (16) has the first valve seat (18), and that the first valve closing body (14) when pressed against the first valve seat (18) by said first spring element (28) presses the second valve closing body (16) against the second valve seat (20).

12. A valve in accordance with claim 10, in which the first valve closing body (14) is pressed by said first spring element (28) against the first valve seat (18), and the force of the first spring element (28) is greater than the force of the second spring element (32) of the second valve closing body (16).

13. A valve in accordance with claim 10, in which the first valve closing body (14) is pressed by said first spring element (28) against the first valve seat (18), and the force of the first spring element (28) is greater than the force of the second spring element (32) of the second valve closing body (16).

14. A valve in accordance with claim 10, in which the valve (10) has an electromagnet (30, 44) for actuating the first valve closing body (14).

15. A valve in accordance with claim 11, in which the valve (10) has an electromagnet (30, 44) for actuating the first valve closing body (14).

16. A valve in accordance with claim 12, in which the valve (10) has an electromagnet (30, 44) for actuating the first valve closing body (14).

17. A valve in accordance with claim 13, in which the valve (10) has an electromagnet (30, 44) for actuating the first valve closing body (14).

* * * * *